(No Model.) 3 Sheets—Sheet 1.
J. S. DETRICK.
UNIVERSAL JOINT.
No. 477,625. Patented June 21, 1892.
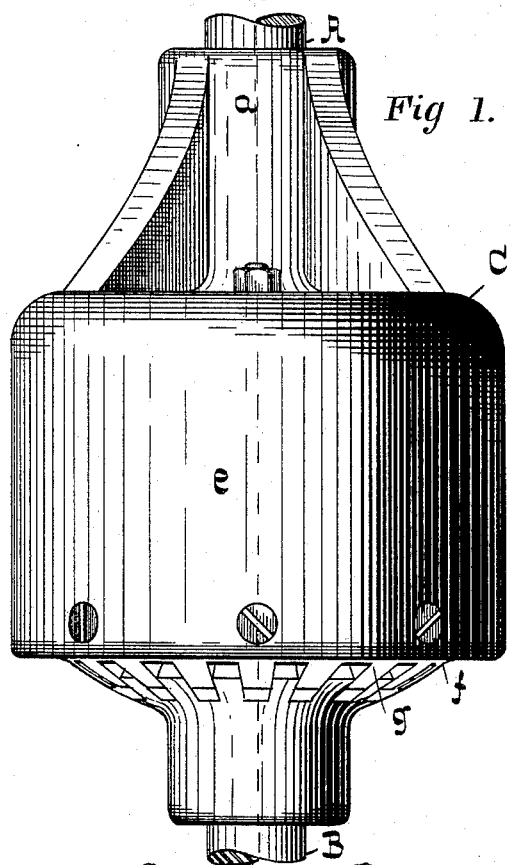
Fig 1.
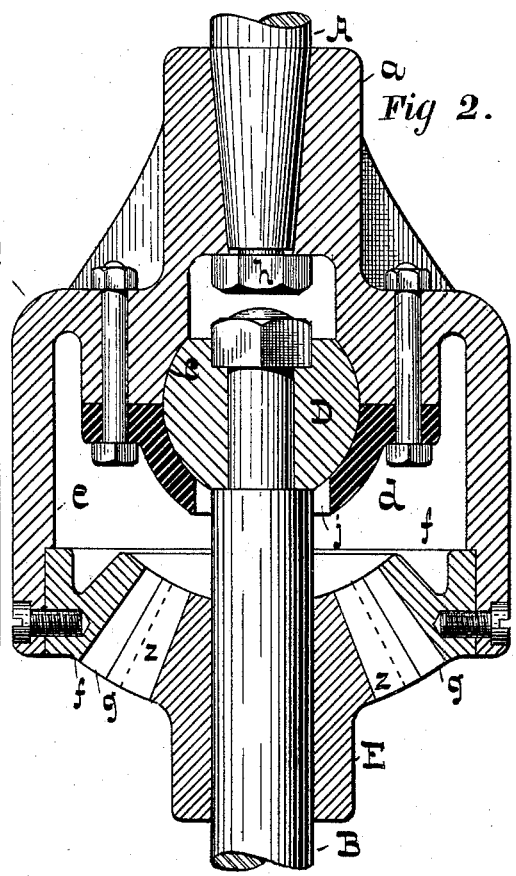
Fig 2.
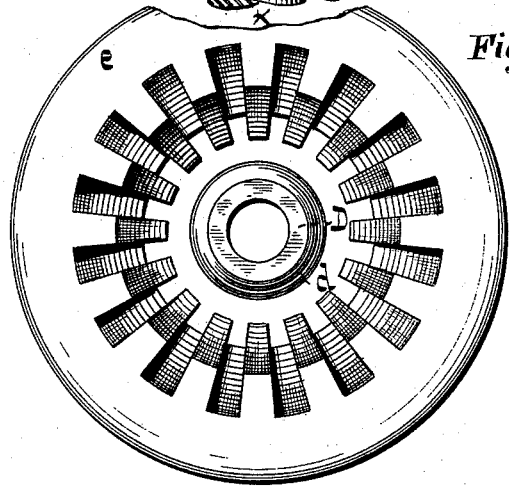
Fig 3.
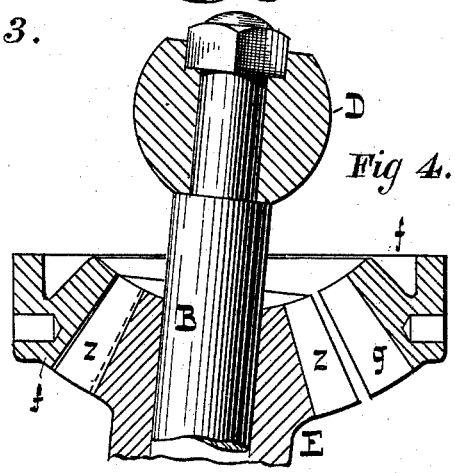
Fig 4.
WITNESSES
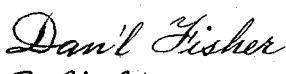
Dan'l Fisher
B. H. Howard
INVENTOR
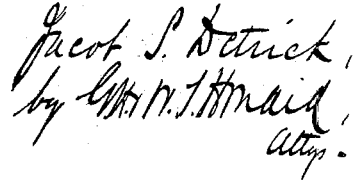
Jacob S. Detrick,
by Geo. W. T. Howard
Attys.

(No Model.) 3 Sheets—Sheet 2.

J. S. DETRICK.
UNIVERSAL JOINT.

No. 477,625. Patented June 21, 1892.

WITNESSES
Dan'l Fisher
B. W. Howard

INVENTOR
Jacob S. Detrick,
by Geo. W. T. Howard
Atty.

(No Model.)
3 Sheets—Sheet 3.

J. S. DETRICK.
UNIVERSAL JOINT.

No. 477,625. Patented June 21, 1892.

WITNESSES
Dan'l Fisher
B. W. Howard

INVENTOR
Jacob S. Detrick,
by Geo. W. T. Howard,
Atty.

UNITED STATES PATENT OFFICE.

JACOB S. DETRICK, OF BALTIMORE, MARYLAND.

UNIVERSAL JOINT.

SPECIFICATION forming part of Letters Patent No. 477,625, dated June 21, 1892.

Application filed June 15, 1891. Serial No. 396,251. (No model.)

*To all whom it may concern:*

Be it known that I, JACOB S. DETRICK, of the city of Baltimore and State of Maryland, have invented certain Improvements in Universal Joints, of which the following is a specification.

This invention relates to a universal joint or coupling especially adapted to transmit rotary motion from a vertical driving-shaft in fixed bearing-boxes to a pendent shaft susceptible of a swinging movement and unsupported in bearing-boxes, or a shaft in which the lower portion thereof describes a circle during its revolution, as will hereinafter fully appear.

In the further description of the invention which follows reference is made to the accompanying drawings, forming a part hereof, and in which—

Figure 6:
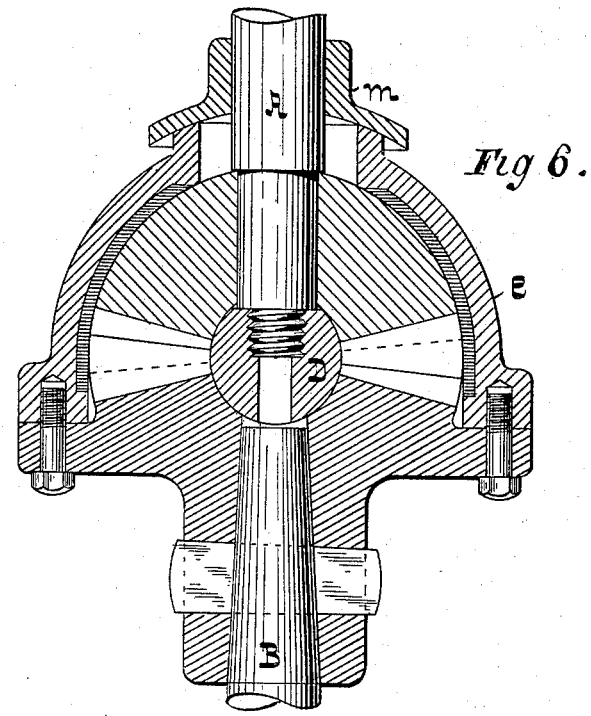
Figure 5:
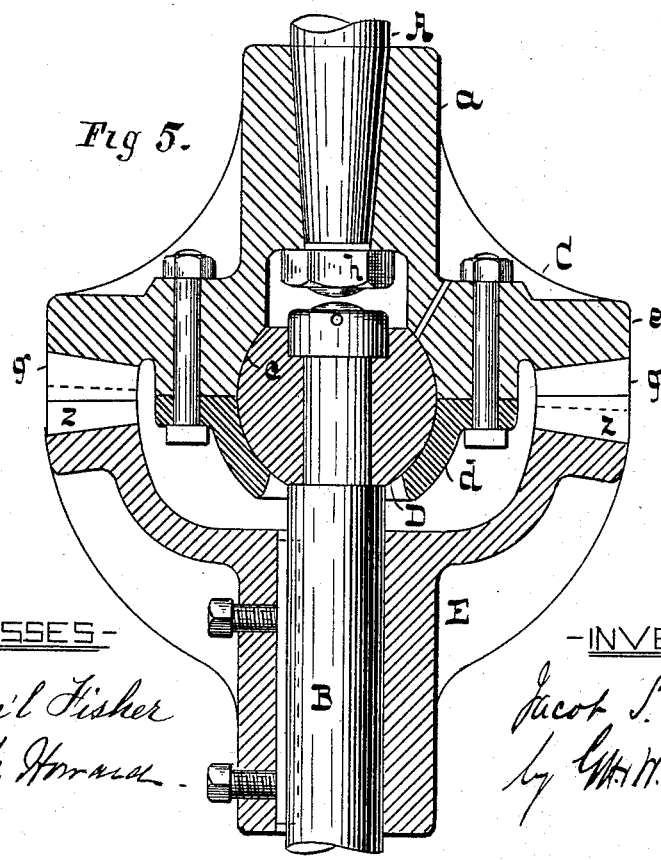
Figure 7:
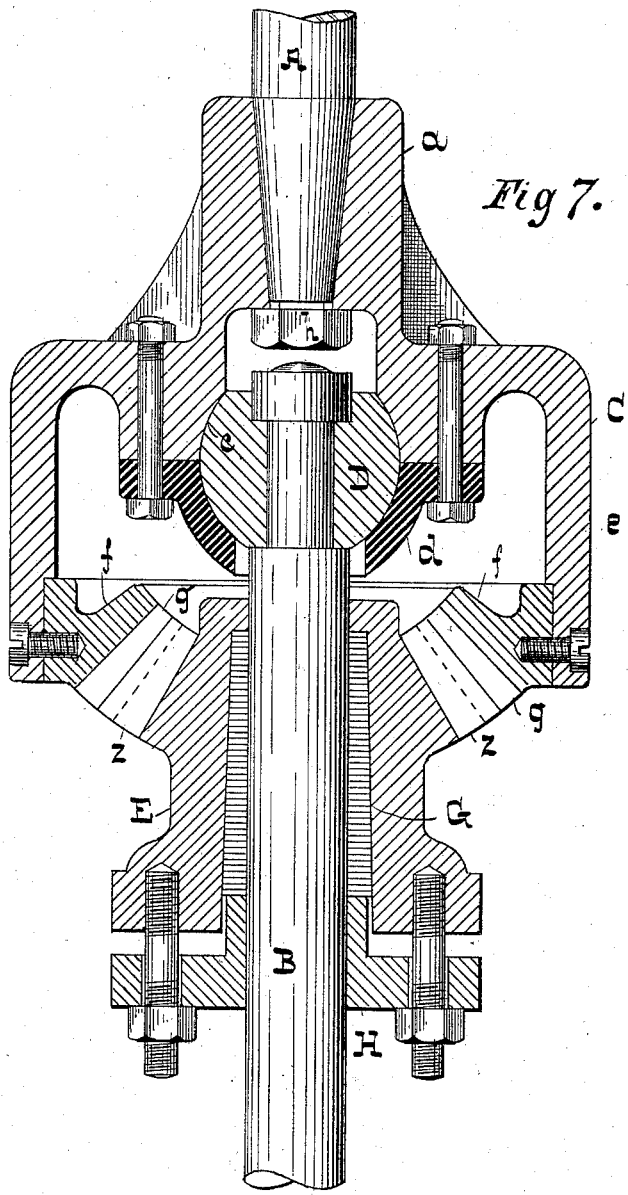

Figure 1 is an exterior side view of the universal joint, together with the ends of the two shafts connected thereby, the said shafts being shown in alignment. Fig. 2 is a section of Fig. 1, taken on the dotted line $xx$, except that the shafts are shown in full. Fig. 3 is an under side view of Fig. 1 with the lower pendent shaft and the part of the joint fastened thereto removed. Fig. 4 is a sectional view of certain portions of the joint and the upper end of the lower pendent shaft, which is shown as out of alignment with the axial line of the upper shaft or in the position which it occupies when in operation. Figs. 5 and 6 illustrate modifications in the construction of the joint hereinafter described. Fig. 7 illustrates means for establishing a slightly-flexible connection between the lower swinging shaft and the gear-wheel which communicates motion from the upper shaft thereto.

Referring to Figs. 1, 2, 3, and 4, A is the vertical driving-shaft, adapted to revolve in bearing-boxes, (not shown,) and B the swinging or pendent shaft to be driven. The universal joint which connects these shafts has, essentially, three parts or members C, D, and E.

The member C consists of a socket $a$, in which the lower end of the shaft A is secured. This socket has a hollow spherical or recessed face $c$, a hollow spherical cap $d$, an inclosing shell $e$, extending downward, and an annulus $f$, bolted to the shell $e$, having teeth $g$ on its inner annular surface. The end of the shaft A is preferably tapered and threaded and provided with a nut $h$, whereby it is held within the socket $a$.

The member D of the joint consists of a ball secured on or formed integral with the shaft B. This ball is held in the spherical opening formed between the face $c$ and the cap $d$, and the shaft passes through the latter, which has a hole $j$ for the purpose, which is made somewhat larger than the shaft to allow of the swinging movement before alluded to.

The member E of the universal joint is a spur-gear secured on the shaft B, with its teeth in mesh with those of the annulus $f$. When the shaft B is hanging in a vertical position, as shown in Figs. 1 and 2, the pitch-lines of the teeth of the annulus and gear, respectively denoted by $g$ and $z$, do not meet, but are separated, the teeth being only slightly engaged; but when the pendent shaft B is moved out and made to occupy its working position, as shown in Fig. 4, the pitch-lines of the teeth are brought together at one side, while the teeth are separated at the other. With the construction described the pendent shaft is supported by the ball, which admits of its being moved out or placed at an angle with reference to the shaft A and driven by the interlocking teeth of the annulus and gear-wheel.

It will be understood that in order to make the gears interlock properly the pitch-lines all extend radially from the center of the ball.

In Fig. 5 the same construction and arrangement of parts above described are practically preserved, except that instead of an interiorly-toothed annulus bolted in the shell the shell itself is provided with teeth. In other words, the members C and E of the joint are alike and the removable annulus is dispensed with.

In Fig. 6 the ball D is on the shaft A and the shell attached to the gear on the swinging shaft. The shell is hemispherical and lined with Babbitt metal, which is closely in contact with the upper spherical surface of the gear attached to the upper vertical shaft A. The enlarged shaft-hole in the upper part of the shell is covered by a flange $m$ on the shaft A to exclude dust. Notwithstanding these changes the distinguishing character of the invention is preserved.

In mills in which the lower pendent shaft is provided with a heavy grinding-roll or disk, which in the operation of the mill crushes the substance to be ground between itself and the inner surface of a shell, the shock occasioned by the action of the roll or disk on the material, and particularly when the material consists of hard pieces varying in size, is communicated to the shaft to such an extent as to have a tendency to break the same within or near the spur-wheel. This tendency to fracture in the shaft at the point specified is probably caused by the failure of the gear on account of friction between its teeth and those of the annulus to respond to sudden vibrations or pulsations of the swinging shaft, and it therefore becomes necessary to effect a slightly-flexible connection between the shaft and gear, so that vibrations or pulsations not responded to by the gear may be taken up. This is best effected by boring out the gear to form a packing or stuffing box G, which is filled with some slightly-flexible material—such as rings of leather—and held tightly in place by a gland H, as shown in Fig. 7.

To facilitate the tight packing of the rings of leather in the stuffing-box, the box is made somewhat tapering, as shown. With this arrangement the leather takes up the shock and the upper part of the lower shaft is relieved.

I claim as my invention—

1. In combination with two revoluble shafts, a universal joint which consists of an inclosed ball, whereby the said shafts are connected and adapted to be moved out of alignment without dislocation, and two toothed contact-surfaces independent of the said ball, whereby motion is communicated from one shaft to the other, substantially as and for the purpose specified.

2. In a universal joint, a toothed shell having a socket for one revoluble shaft and a spherical seat with a spherical cap, combined with a ball inclosed in the spherical space between the seat and the cap, to which the second revoluble shaft is secured, and a gear-wheel attached to the second revoluble shaft, in mesh with the toothed shell and susceptible of a swinging movement, substantially as specified.

JACOB S. DETRICK.

Witnesses:
WM. T. HOWARD,
E. CRUSE.